United States Patent
Chen et al.

(10) Patent No.: US 12,410,846 B2
(45) Date of Patent: Sep. 9, 2025

(54) SUSPENSION BUSHING AND SYSTEM FOR POWERTRAIN OF ELECTRICAL VEHICLE

(71) Applicant: BOGE RUBBER & PLASTICS ZHUZHOU CO., LTD., Hunan (CN)

(72) Inventors: Yan Chen, Hunan (CN); Yingqiang Gong, Hunan (CN)

(73) Assignee: BOGE RUBBER & PLASTICS ZHUZHOU CO., LTD., Hunan (CN)

( * ) Notice: Subject to any disclaimer, the term of this patent is extended or adjusted under 35 U.S.C. 154(b) by 442 days.

(21) Appl. No.: 18/010,461

(22) PCT Filed: Aug. 17, 2020

(86) PCT No.: PCT/CN2020/109503
§ 371 (c)(1),
(2) Date: Dec. 15, 2022

(87) PCT Pub. No.: WO2022/000724
PCT Pub. Date: Jan. 6, 2022

(65) Prior Publication Data
US 2023/0184307 A1   Jun. 15, 2023

(30) Foreign Application Priority Data
Jul. 3, 2020   (CN) .......................... 202010630960.1

(51) Int. Cl.
*F16F 1/38* (2006.01)

(52) U.S. Cl.
CPC .......... *F16F 1/3835* (2013.01); *F16F 1/3856* (2013.01); *F16F 2224/025* (2013.01); *F16F 2234/02* (2013.01)

(58) Field of Classification Search
None
See application file for complete search history.

(56) References Cited

U.S. PATENT DOCUMENTS

| | | | |
|---|---|---|---|
| 7,748,689 B2 * | 7/2010 | Thibault | F16F 1/3807 267/293 |
| 2016/0159314 A1 * | 6/2016 | Ebner | B60R 21/26005 280/736 |

FOREIGN PATENT DOCUMENTS

| | | |
|---|---|---|
| CN | 109501565 | 3/2019 |
| CN | 110039981 | 7/2019 |
| CN | 209654522 | 11/2019 |
| CN | 210191147 | 3/2020 |

(Continued)

OTHER PUBLICATIONS

"International Search Report (Form PCT/ISA/210) of PCT/CN2020/109503," mailed on Mar. 25, 2021, with English translation thereof, pp. 1-4.

(Continued)

*Primary Examiner* — Melanie Torres Williams
(74) *Attorney, Agent, or Firm* — JCIPRNET

(57) ABSTRACT

A suspension bushing for a powertrain of an electric vehicle includes a mandrel, an outer sleeve and a rubber mainspring connected between the mandrel and the outer sleeve. The rubber main spring includes multiple main parts arranged at intervals and surrounding the outer contour of the mandrel. At least one side of each of the main parts is provided with an extending part. An end surface of the extending part and an end surface of each main part form a stepped structure.

7 Claims, 3 Drawing Sheets

(56) References Cited

FOREIGN PATENT DOCUMENTS

DE 102006006472 8/2007

OTHER PUBLICATIONS

"Written Opinion of the International Searching Authority (Form PCT/ISA/237) of PCT/CN2020/109503," mailed on Mar. 25, 2021, pp. 1-3.

\* cited by examiner

SUSPENSION BUSHING AND SYSTEM FOR POWERTRAIN OF ELECTRICAL VEHICLE

CROSS-REFERENCE TO RELATED APPLICATION

This application is a 371 of international application of PCT application serial no. PCT/CN2020/109503 filed on Aug. 17, 2020 which claims the priority benefit of China application no. 202010630960.1, filed on Jul. 3, 2020. The entirety of each of the above mentioned patent applications is hereby incorporated by reference herein and made a part of this specification.

TECHNICAL FIELD

The invention relates to electric vehicles, in particular to a suspension bushing and system for a powertrain of electric vehicle.

DESCRIPTION OF RELATED ART

Compared with traditional fuel vehicles, the motor torque of electric vehicles may exceed 1000 Nm quickly within an extremely short time. Due to the high speed, the excitation frequency of the motor to a suspension system may reach thousands of hertz. All existing suspension bushings for the powertrain, no matter rubber suspension bushings or hydraulic suspension bushings, cannot overcome the defect of high-frequency dynamic hardening, so the dynamic stiffness of suspension will be increased sharply in case of a high frequency, thus drastically reducing the vibration isolation capacity of the suspension bushings and even making the suspension bushings lose the vibration isolation capacity. With the gradual use of electric vehicles, the requirement for high-frequency vibration isolation of the motor powertrain of electric vehicles is becoming ever considerable. Existing technical solutions for high-frequency vibration isolation are as follows. (1) A vibration absorption layer is additionally disposed on a rubber mainspring to drastically reduce the dynamic stiffness within a high frequency band of 800-3000 Hz to improve the vibration isolation performance of the whole bushing; however, the vibration absorption layer may lead to the risk of high-frequency noise. (2) Through a short cantilever and a lightweight of a suspension structure in the suspension system, the suspension structure is made to have a high modality and be free of resonance, thus improving the NVH performance of a whole vehicle; however, not any suspension point of any suspension system can provide favorable conditions for realizing an ideal suspension structure.

SUMMARY

The technical issue to be settled by the invention is to overcome the defects of the prior art by providing a suspension bushing for a powertrain of electric vehicle, which is simple and compact in structure, easy to machine and manufacture, low in high-frequency dynamic stiffness, and free of the risk of high-frequency noise.

The invention further provides a suspension system comprising the suspension bushing.

To settle the above technical issue, the invention adopts the following technical solution:

A suspension bushing for a powertrain of an electric vehicle includes a mandrel, an outer sleeve, and a rubber mainspring connected between the mandrel and the outer sleeve. The rubber mainspring comprises multiple main parts disposed around an outer contour of the mandrel at intervals, an extending part is disposed on at least one side of each main part, and a stepped structure is formed by an end surface of an extending part and an end surface of the main part.

As a further improvement of the technical solution, the rubber mainspring further comprises an inner connecting ring and an outer connecting ring, and the main parts are connected between the inner connecting ring and the outer connecting ring.

As a further improvement of the technical solution, the extending part is connected to the inner connecting ring; or, the extending part is connected to the outer connecting ring; or, the inner connecting ring and the outer connecting ring are both connected to the extending part.

As a further improvement of the technical solution, a main portion of the mandrel is circular, and the multiple main parts are regularly arranged in a circumferential direction of the mandrel.

As a further improvement of the technical solution, the mandrel and the outer sleeve are connected through the rubber mainspring by vulcanization.

As a further improvement of the technical solution, an axis of the mandrel coincides with or is parallel to an axis of the outer sleeve.

A suspension system for a powertrain of an electric vehicle comprises the suspension bushing for the powertrain of the electric vehicle.

Compared with the prior art, the invention has the following advantages. The rubber mainspring of the suspension bushing for a powertrain of electric vehicles comprises the multiple main parts arranged around the outer contour of the mandrel at intervals, and the extending parts forming the stepped structures with the main parts are disposed on at least one side of the main parts, so that the suspension bushing is easy to machine and manufacture. Tests indicate that this structure reduces the high-frequency dynamic stiffness of the bushing and improves the vibration isolation performance of the bushing. Compared with an additional vibration absorption layer in the prior art, the extending parts extend from the rubber main parts, so that the stability is better, and the risk of high-frequency noise is basically avoided. Each extending part is located in a gap between two adjacent main parts, so that the size of the rubber mainspring is not increased, the structure is compact, and the suspension bushing can be applied to suspension points of various suspension systems.

The suspension system for a powertrain of electric vehicles comprises the suspension bushing mentioned above, thus having the same advantages as the suspension bushing.

DESCRIPTION OF THE EMBODIMENTS

Figure 1:
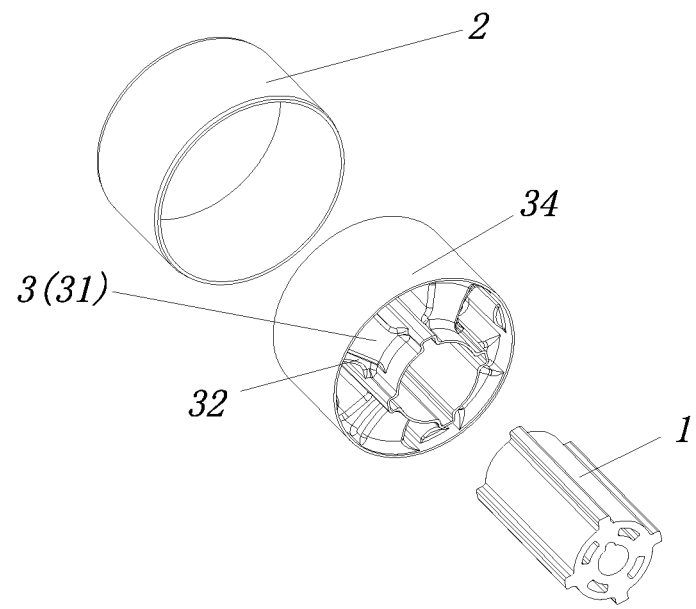
FIG. 1 is a disassembled structure diagram of a suspension bushing for a powertrain of an electric vehicle of the invention.
Figure 2:
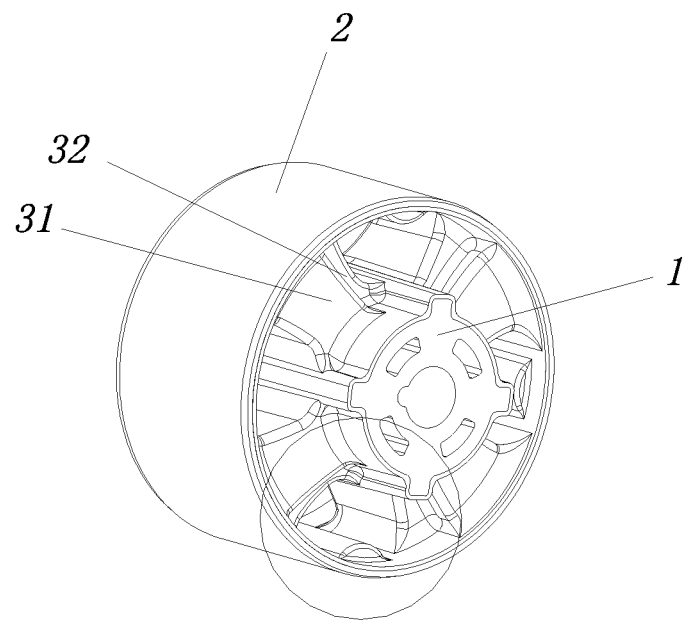
FIG. 2 is an assembled structural diagram of the suspension bushing for the powertrain of the electric vehicle of the invention.
Figure 3:
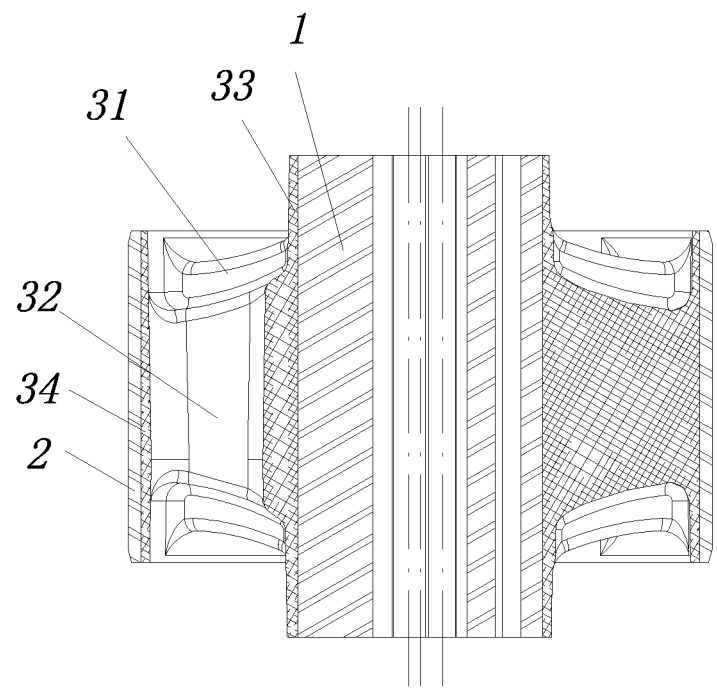
FIG. 3 is an axial sectional view of the suspension bushing for the powertrain of the electric vehicle of the invention.
Figure 4:
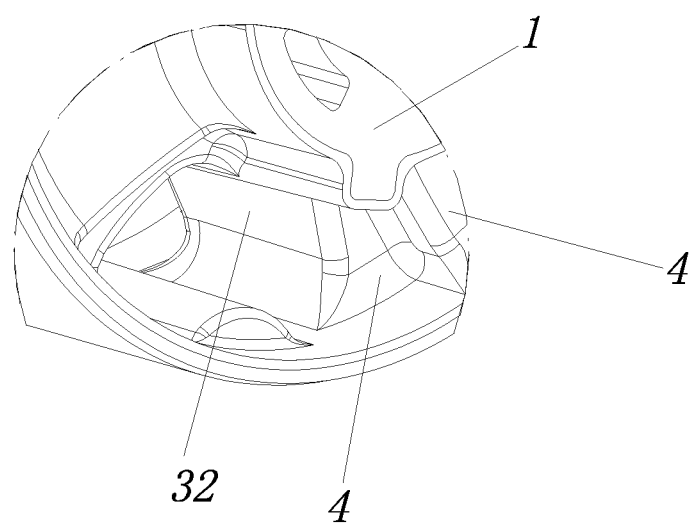
FIG. 4 is a partial enlarged view of the suspension bushing for the powertrain of the electric vehicle according to the invention.

The invention will be explained in further detail below in conjunction with the accompanying drawings and specific embodiments in the specification.

FIG. 1 to FIG. 4 illustrate one embodiment of a suspension bushing for a powertrain of an electric vehicle according of the invention. The suspension bushing for the powertrain of the electric vehicle in this embodiment comprises a mandrel 1, an outer sleeve 2, and a rubber mainspring 3 connected between the mandrel 1 and the outer sleeve 2. The rubber mainspring 3 comprises multiple main parts 31 disposed around an outer contour of the mandrel 1 at intervals, an extending part 32 is disposed on at least one side of each main part 31, and a stepped structure is formed by an end surface 4 of the extending part 32 and an end surface 4 of each of the main parts 31, or a length of the extending part 32 is smaller than that of each of the main parts 31 in an axial direction of the mandrel 1; or, the extending part 32 are located between two end surfaces of each of the main parts 31. An axis of the mandrel 1 coincides with or is parallel to an axis of the outer sleeve 2; or, the axis of the mandrel 1 and the axis of the outer sleeve 2 are arranged coaxially or eccentrically.

Figure 6:
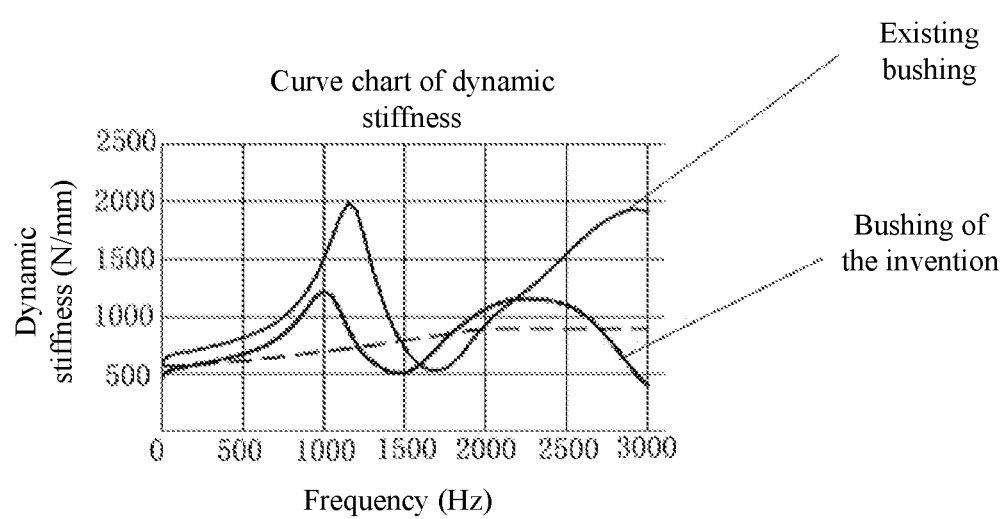
FIG. 6 is a curve chart of the dynamic stiffness of a suspension bushing for a powertrain of an electric vehicle of the invention.

According to the suspension bushing for the powertrain of the electric vehicle, the rubber mainspring 3 comprises the multiple main parts 31 arranged around the outer contour of the mandrel 1 at intervals, and the extending parts 32 forming the stepped structures with the main parts 31 are disposed on at least one side of the main parts 31, so that the suspension bushing is easy to machine and manufacture. Referring to FIG. 6, tests indicate that, compared with existing bushings, this structure reduces the high-frequency dynamic stiffness of the bushing and improves the vibration isolation performance of the bushing. Compared with an additional vibration absorption layer in the prior art, the extending parts 32 extend from the rubber main parts 31, so that the stability is better, and the risk of high-frequency noise is basically avoided. Each extending part 32 is located in a gap between two adjacent main parts 31, so that the size of the rubber mainspring 3 is not increased, the structure is compact, and the suspension bushing can be applied to suspension points of various suspension systems.

Further, in this embodiment, the rubber mainspring 3 further comprises an inner connecting ring 33 and an outer connecting ring 34, and the main parts 31 are connected between the inner connecting ring 33 and the outer connecting ring 34. The main parts 31 are connected into a whole through the inner connecting ring 33 and the outer connecting ring 34. As a preferred technical solution, when a main portion of the mandrel 1 is circular, the multiple main parts 31 are regularly arranged in a circumferential direction of the mandrel 1, so that the properties of all parts of the rubber mainspring 3 are kept consistent in the circumferential direction.

Figure 5:
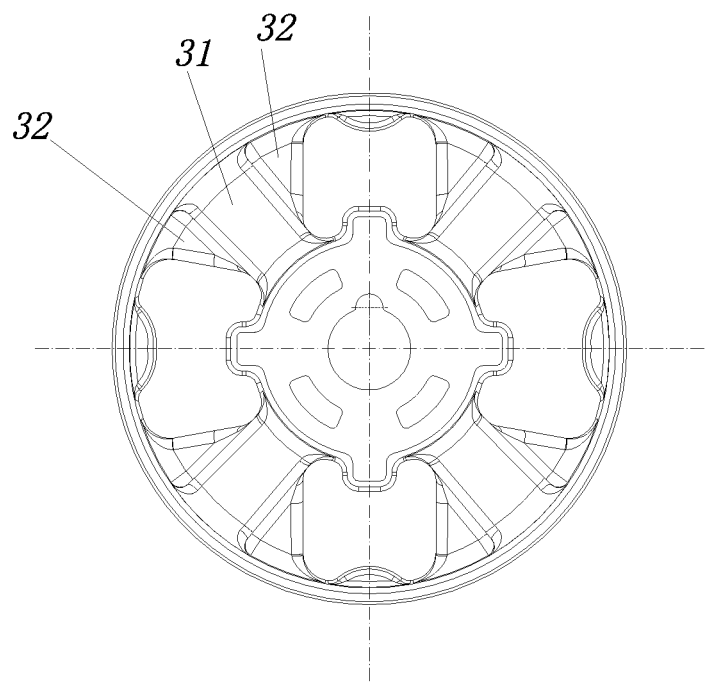
FIG. 5 is a structural diagram of another embodiment of a suspension bushing for a powertrain of an electric vehicle of the invention.

As a preferred technical solution, in this embodiment, the inner connecting ring 33 and the outer connecting ring 34 are both connected and integrated with the extending parts 32, so that the dynamic performance of the rubber mainspring 3 is stable. Referring to FIG. 5, in other embodiments, the extending parts 32 may be connected to the inner connecting ring 33 only; or the extending parts 32 may be connected to the outer connecting ring 34 only.

As a preferred technical solution, the mandrel 1 and the outer sleeve 2 are connected through the rubber mainspring 3 by vulcanization.

A suspension system for a powertrain of an electric vehicle in this embodiment comprises the suspension bushing for the powertrain of the electric vehicle.

The suspension system for the powertrain of the electric vehicle comprises the suspension bushing mentioned above, thus having the same advantages as the suspension bushing.

Although the invention has been disclosed above with reference to preferred embodiments, these preferred embodiments are not used to limit the invention. Any skilled in the art can make many variations and modifications to the technical solution of the invention or obtain equivalent embodiments according to the technical contents disclosed above without departing from the scope of the technical solution of the invention. So, any simple amendments or equivalent variations and modifications made to the above embodiments according to the technical essence of the invention without departing from the contents of the technical solution of the invention should also fall within the protection scope of the technical solution of the invention.

What is claimed is:

1. A suspension bushing for a powertrain of an electric vehicle, the suspension bushing comprising a mandrel, an outer sleeve, and a rubber mainspring connected between the mandrel and the outer sleeve, wherein the rubber mainspring comprises multiple main parts disposed around an outer contour of the mandrel at intervals, an extending part is disposed on at least one side of each of the main parts and extends from the main part, a length of the extending part is smaller than that of each of the main parts in an axial direction of the mandrel, and a stepped structure is formed by an end surface of the extending part and an end surface of each of the main parts.

2. The suspension bushing for the powertrain of the electric vehicle according to claim 1, wherein the rubber mainspring further comprises an inner connecting ring and an outer connecting ring, and the main parts are connected between the inner connecting ring and the outer connecting ring.

3. The suspension bushing for the powertrain of the electric vehicle according to claim 2, wherein the extending part is connected to the inner connecting ring; or, the extending part is connected to the outer connecting ring; or, the inner connecting ring and the outer connecting ring are both connected to the extending part.

4. The suspension bushing for the powertrain of the electric vehicle according to claim 1, wherein a main portion of the mandrel is circular, and the multiple main parts are regularly arranged in a circumferential direction of the mandrel.

5. The suspension bushing for the powertrain of the electric vehicle according to claim 1, wherein the mandrel and the outer sleeve are connected through the rubber mainspring by vulcanization.

6. The suspension bushing for the powertrain of the electric vehicle according to claim 1, wherein an axis of the mandrel coincides with or is parallel to an axis of the outer sleeve.

7. A suspension system for a powertrain of an electric vehicle, the suspension system comprising the suspension bushing according to claim 1.

\* \* \* \* \*